United States Patent [19]

Murayama et al.

[11] Patent Number: 5,412,533
[45] Date of Patent: May 2, 1995

[54] SOLID ELECTROLYTIC CAPACITOR AND MANUFACTURING METHOD THEREOF

[75] Inventors: Tomohiro Murayama, Fukuoka; Yasuo Kanetake, Kyoto, both of Japan

[73] Assignee: Rohm Co., Ltd., Kyoto, Japan

[21] Appl. No.: 262,956

[22] Filed: Jun. 21, 1994

[30] Foreign Application Priority Data

Jun. 22, 1993 [JP] Japan .................................. 5-176005
Jul. 20, 1993 [JP] Japan .................................. 5-179082

[51] Int. Cl.$^6$ ........................ H01G 1/005; H01G 9/04
[52] U.S. Cl. .................................... 361/528; 29/25.03
[58] Field of Search ............... 361/523, 528, 529, 538, 361/539, 540; 29/25.03

[56] References Cited

U.S. PATENT DOCUMENTS

| | | | |
|---|---|---|---|
| 3,818,286 | 6/1974 | Ganz | 361/523 |
| 3,855,505 | 12/1974 | Karlik, Jr. | 361/523 |
| 4,349,860 | 9/1982 | Ohsawa | 361/310 |
| 4,571,664 | 2/1986 | Hyland | 361/433 |
| 4,951,952 | 5/1986 | Asscher | 361/433 |
| 5,075,940 | 12/1991 | Kuriyama | 29/25.03 |

Primary Examiner—Bruce A. Reynolds
Assistant Examiner—Michael D. Switzer
Attorney, Agent, or Firm—Brumbaugh, Graves, Donohue & Raymond

[57] ABSTRACT

A solid electrolytic capacitor is constructed by a capacitor element body, a metal rod extended through the central part of the element body, an anode member, and an insulating layer placed between the flange part of the anode member and the element body. The capacitor element body consists of a chip-like porous solid formed by shaping and sintering rectifying metal particles, the porous solid having a dielectric layer and a solid electrolytic layer both being formed thereon. The anode member includes a protruded part and a flange part, the end face of the protruded part being brought into contact and connected with one of the end faces of the metal rod. A method of manufacturing solid electrolytic capacitors thus constructed is also disclosed.

11 Claims, 9 Drawing Sheets

SOLID ELECTROLYTIC CAPACITOR AND MANUFACTURING METHOD THEREOF

BACKGROUND OF THE INVENTION

The present invention relates to a solid electrolytic capacitor and a method of manufacturing the solid electrolytic capacitors.

Metal particles having rectifying action, such as tantalum or niobium, are formed and sintered into porous chips 21 each with an upstanding anode rod 22 made of metal, such as tantalum or niobium, as shown in FIG. 14. The anode rods 22 of a plural number of chips 21 thus formed are mounted on a horizontal plate 23 in a state that those chips 21 are arrayed at preset pitches along the horizontal plate 23, and the upper faces 21a of the chips 21 are aligned and flush with one another.

The chips 21 thus mounted on the horizontal plate 23 are immersed in a forming liquid 24, such as phosphate aqueous solution, as shown in FIG. 15. In this state, an anodic treatment is carried out under flow of d.c. current, so that a dielectric layer 25, made of tantalum pentoxide, is formed on the surfaces of the rectifying metal particles of each chip 21. In this case, the dielectric layer 25 is also formed on the outer surface of the root of each anode rod 22 over a proper length or height thereof by setting the upper faces 21a of the chips 21 at a proper depth below the surface level of the forming liquid 24.

Then, as shown in FIG. 16, the chips 21 with the dielectric layers 25 thus formed, which are suspended from the horizontal plate 23, are immersed into an aqueous solution 26 of manganese nitrate, at such a depth that the upper faces 21a of the chips 21 are not lower than the liquid level of the manganese nitrate aqueous solution 26. After the innards of the chips 21 are impregnated with the manganese nitrate aqueous solution 26, the chips 21 are pulled out of the manganese nitrate aqueous solution 26, and heated to remove moisture therefrom by evaporation. The impregnation and evaporation process is repeated several times. As a result, a solid electrolytic layer 27 made of manganese dioxide is formed on the surface of the dielectric layer 25 of each chip 21. Alternatively, a solid electrolytic layer as an organic semiconductor layer may be formed on the surface of the dielectric layer 25. To form the solid electrolytic layer, an electrolytic polymerizing method or a vapor phase polymerizing method may be used. In this way, capacitor elements are manufactured. In the process for forming the solid electrolytic layer 27 by immersing the chips 21 into the manganese nitrate aqueous solution 26, if the upper surfaces 21a of the chips are below the liquid level of the aqueous solution, the solid electrolytic layer 27 is formed to cover the dielectric layer 25 at the root of the anode rod 22. The anode rod 22 as anode is electrically continuous to the solid electrolytic layer 27 as the cathode. The resultant capacitor element will lose its function as a capacitor. In the process of forming the solid electrolytic layer, if the liquid level of the manganese nitrate aqueous solution 26 is much lower than the upper faces 21a of the chips 21, an insufficient capacitance is obtained relative to the volume of the chip 21. In this respect, the level of the chips 21 in the aqueous solution must be strictly adjusted.

Thus, in manufacturing the solid electrolytic capacitors by the conventional method, the anode rods 22 must be protruded from the chips 21 in order to insulate the anode from the cathode by isolation. A graphite layer is formed on the solid electrolytic layer 27 of each capacitor element thus formed, and a conductive layer of metal, such as silver or gold, is further formed over the graphite layer of the capacitor element. As shown in FIG. 17, a lead terminal 29 is connected to the conductive layer of the chip 21, and another lead terminal 30 is connected to the anode rod 22 protruded from the chip 21. Finally, the structure of the capacitor element 28 with the lead terminals 29 and 30 is molded by resin 31 into a capacitor with the anode and cathode lead terminals of which the major parts are exposed outside, as shown.

As described above, in the conventional method of manufacturing the solid electrolytic capacitors, the dielectric layer and the solid electrolytic layer must be formed on the chips in a state that the anode rods are extended upward from the upper faces of the chips, in order to secure an access to the anode from outside. Further, the chips must be processed while being suspended from the horizontal plate. Accordingly, the number of the chips processed at one time is limited by the length of the horizontal plate. This leads to reduction of the production efficiency.

Additionally, in the process to form the dielectric layers and the solid electrolytic layers on the chips, the chips are immersed at an exact depth into the forming liquid and the manganese nitrate aqueous solution in a state that the upper faces of the chips are aligned with one another. This requires complication of the manufacturing work and an exactness of the process control.

The capacitor formed as shown in FIG. 17 is molded by resin. Because of this, the volume of the whole capacitor is large relative to the volume of the capacitor element. The volumetric efficiency is low, and the volume of the capacitor is large relative to the electric capacitance gained.

SUMMARY OF THE INVENTION

The present invention has been made in view of the above circumstances and has an object to provide a solid electrolytic capacitor which is improved in the volumetric efficiency and suitable for a mass production system.

Another object of the present invention is to provide a method of manufacturing solid electrolytic capacitors of high volumetric efficiency in a simple and efficient manner.

To achieve the first above object, there is provided a solid electrolytic capacitor comprising: a capacitor element body consisting of a chip-like porous solid formed by shaping and sintering rectifying metal particles, the porous solid having a dielectric layer and a solid electrolytic layer both being formed thereon; a metal rod extended through the central part of the element body; an anode member including a protruded part and a flange part, the end face of the protruded part being brought into contact and connected with one of the end faces of the metal rod; and an insulating layer placed between the flange part of the anode member and the element body.

To achieve the second object, there is provided a method of manufacturing solid electrolytic capacitors comprising the steps of: shaping rectifying metal particles into a porous rod-like member with a metal rod implanted therein and sintering the porous rod-like member; forming a dielectric layer on the surface of the porous rod-like member; forming a solid electrolytic layer on the dielectric layer already formed; and dividing the porous rod-like member having the dielectric layer and the solid electrolytic layer into a plural number of chip-like capacitor elements of proper size. In the manufacturing method, grooves may be formed on the outer surface of the porous rod-like member while being spaced at proper spatial intervals.

Thus, according to the present invention, there is no need of protruding the anode rod from the capacitor element. Accordingly, in the process for forming capacitor elements, a plural number of porous rod-like members are processed for forming dielectric layers and solid electrolytic layers thereon. A plurality of capacitor elements can be formed in one step, viz., by merely dividing each porous rod-like members thus layered at proper size. Thus, a number of capacitor elements can be manufactured through a series of manufacturing steps.

Since the capacitor elements are formed by dividing each porous rod-like member at proper size, the solid electrolytic layer may be formed so as to cover the dielectric layer formed on the root of the anode rod protruded from the porous rod-like member. A high precision is not required in positioning the porous rod-like members to the horizontal plate when those members are mounted on the horizontal plate, and in setting the depth of the porous rod-like members when those are immersed in the forming liquid and the manganese nitrate aqueous solution.

A capacitor can be formed by coupling together the capacitor element, the insulating layer, and the anode member such that the insulating layer is sandwiched between the capacitor element and the anode member, and the anode member comes in contact with the anode rod contained in the capacitor element. Therefore, the volumetric efficiency of the resultant capacitor is improved.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

The inventor considered that if the anode rod standing erect on the capacitor element could be eliminated in manufacturing and constructing solid electrolytic capacitors, a plural number of capacitor elements would be formed by forming rectifying metal particles into porous rod-like members and sintering the porous rod-like members, forming dielectric layers and solid electrolytic layers thereon, and dividing each porous rod-like member into capacitor elements. The inventor set himself to make a study to realize study this, and reaches such a technical idea that an anode member connected to the end face of a metal rod contained in and extending through a capacitor element is provided on at least one of the end faces of the capacitor element, while being insulated from the solid electrolytic layer to be a cathode by an insulating layer.

This technical idea of the invention will be described in details using some specific embodiments and with reference to the accompanying drawings.

In the description to follow, the invention is embodied in the form of a method of manufacturing tantalum solid electrolytic capacitors and the resultant tantalum solid electrolytic capacitors.

Figure 1:
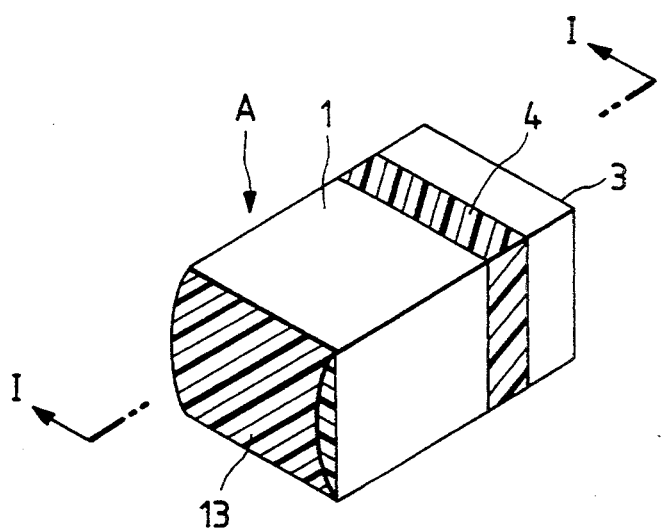
FIG. 1 is a perspective view showing a tantalum solid electrolytic capacitor according to the present invention.
Figure 2:
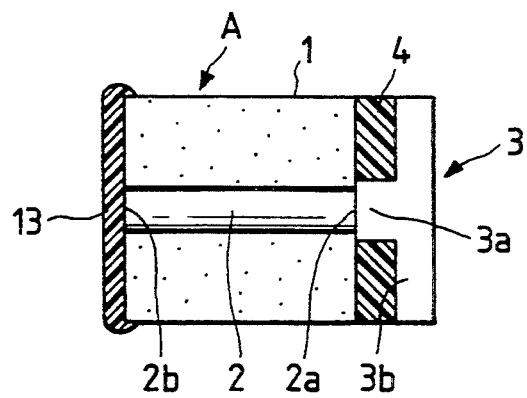
FIG. 2 is a cross sectional view taken on line I—I in FIG. 1.

Reference is first made to FIGS. 1 and 2 showing, in perspective and cross sectional forms, a capacitor manufactured according to the manufacturing method of the invention.

In those figures, reference numeral A designates a capacitor element; numeral 2, a metal rod; 3, an anode member; and 4 and 13, insulating layers.

As shown, the metal rod 2 to serve as an anode is extended through the central part of an element body 1 of the capacitor element A. The anode member 3 consists of a protruded part 3a and a flange part 3b from which the protruded part 3a is protruded. The anode member 3 is connected with the metal rod 2 in a state that the end face of the protruded part 3a of the anode member 3 is brought into contact with the first end face 2a of the metal rod 2. The insulating layer 4 is placed between the flange part 3b of the anode member 3 and the first end face of the element body 1. The second end face of the element body 1, which is opposite to the first end face thereof and located farther apart from the anode member 3, is protected by the insulating layer 13.

A method of manufacturing the capacitor of FIGS. 1 and 2 will be described.

Figure 3:
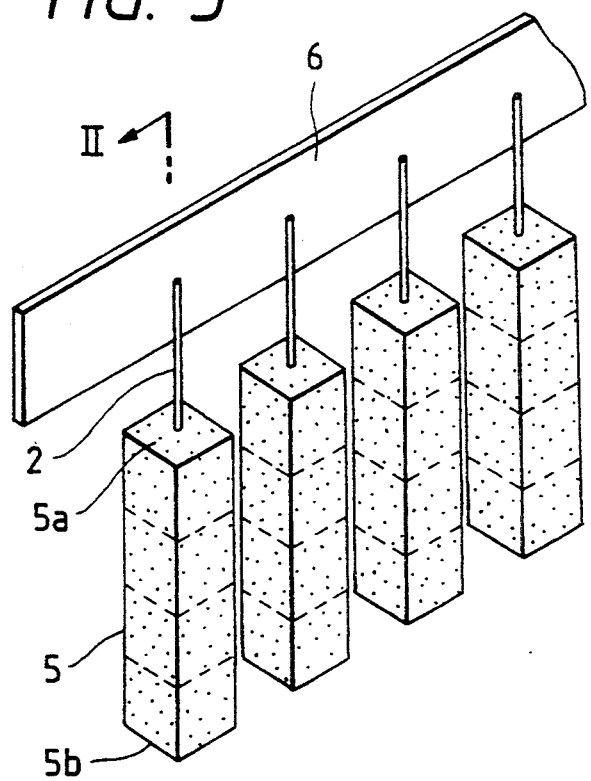
FIG. 3 is a perspective view showing a series of porous rod-like members being mounted on a horizontal plate.
Figure 4:
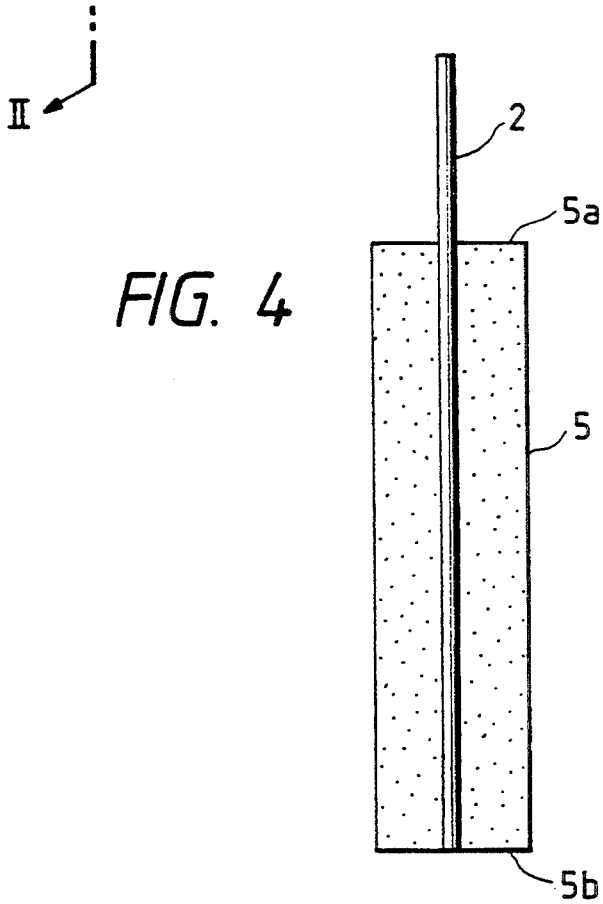
FIG. 4 is a cross sectional view taken on line II—II in FIG. 3.
Figure 5:
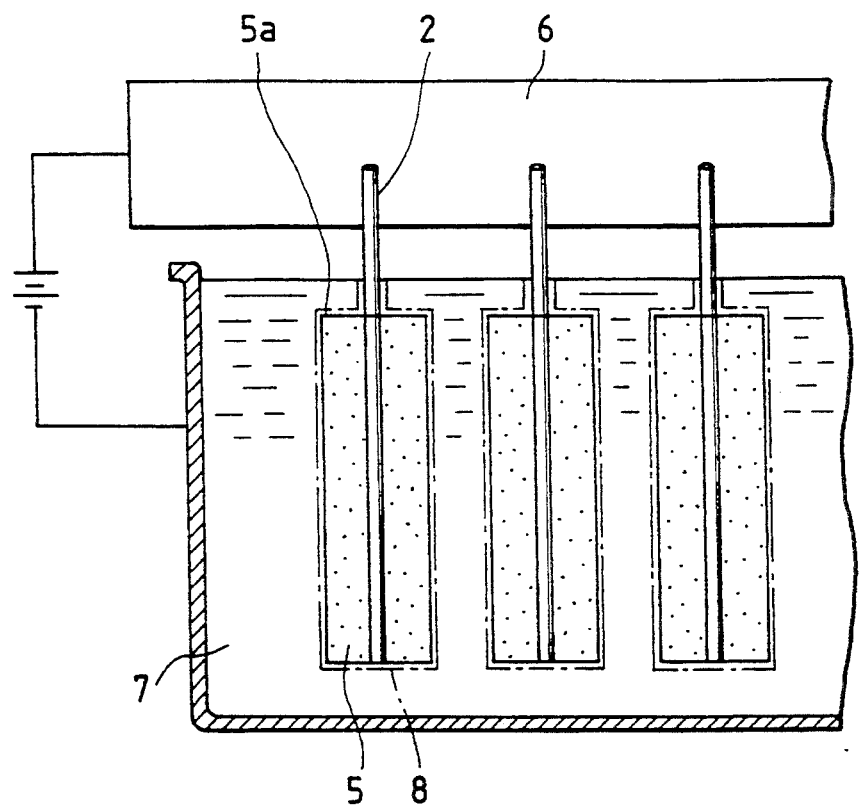
FIG. 5 is a view, in cross sectional form, showing a state where dielectric layers are formed on the chips.

Reference is made to FIGS. 3 and 4. Tantalum particles are shaped into porous rod-like member 5 shaped like a square rod with a metal rod 2. The metal rod 2 is implanted in the porous rod-like member 5, with a part of the metal rod extending outside from the upper face 5a of the porous rod-like member 5. The bottom end of the metal rod 2 reaches the bottom of the lower face 5b of the porous rod-like member 5 or reaches a location near to the bottom of the lower face 5b. The porous rod-like member 5 is sintered. A plural number of porous rod-like members 5 thus structured are prepared. The part of the metal rod 2 extended from the upper face 5a of each porous rod-like member 5 is fastened to a horizontal plate 6 by welding, for example. In this case, those porous rod-like members 5 are arranged at equidistant spatial intervals or pitches on the horizontal plate 6.

The porous rod-like members 5 thus mounted on the horizontal plate 6 are immersed into phosphate aqueous solution 7 (forming liquid). For the anodic treatment, d.c. current is fed as shown. As the result of the anodic treatment, a tantalum pentoxide 8 (dielectric layer) is formed on the surface of the surfaces of the tantalum particles of the porous rod-like members 5. In this case, the tantalum pentoxide 8 is preferably formed on the outer surface of the root of each metal rod 2 over a proper length or height thereof by setting the upper faces 5a of the porous rod-like member 5 at a proper depth below the surface level of the forming liquid 24.

Figure 6:
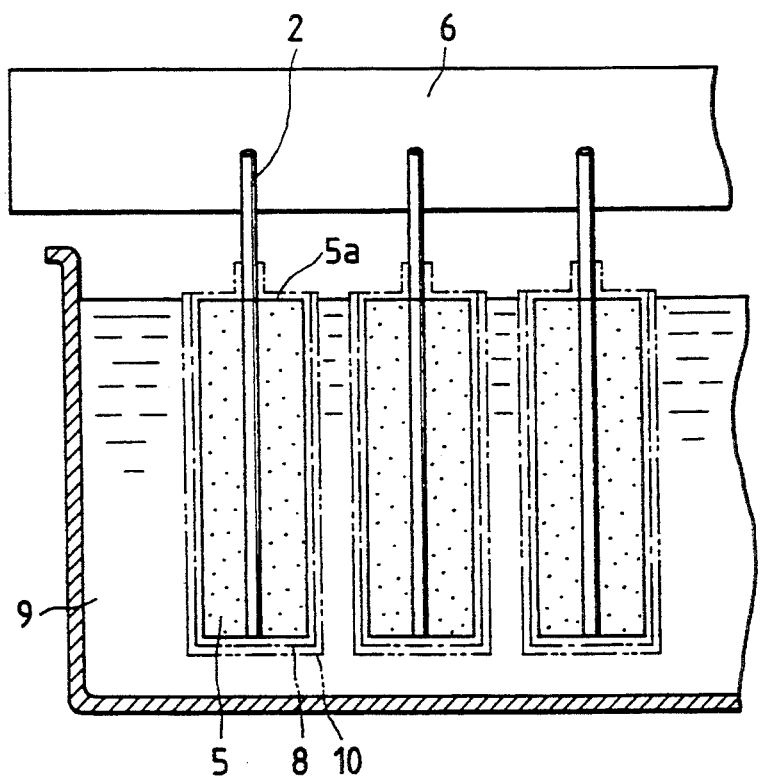
FIG. 6 is a cross sectional view showing a state where solid electrolytic layers are formed on the dielectric layers that are already formed on the chips.

Then, the porous rod-like member 5 covered with the tantalum pentoxide 8, are immersed into manganese nitrate aqueous solution 9, as shown in FIG. 6. After the innards of the porous rod-like member 5 are impregnated with the manganese nitrate aqueous solution 9, the porous rod-like member 5 are pulled out of the manganese nitrate aqueous solution 9, and heated to remove moisture therefrom by evaporation. The impregnation and evaporation process of manganese nitrate aqueous solution is repeated several times. As a result, a manganese dioxide layer 10 (solid electrolytic layer) is formed on the surface of the tantalum pentoxide layer 8.

Figure 7:
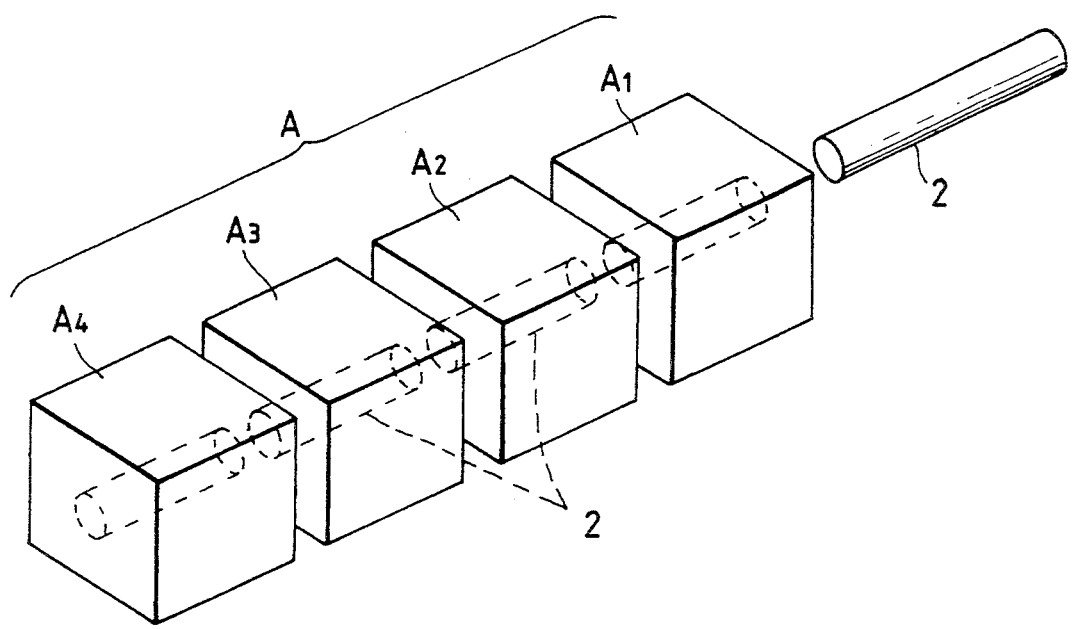
FIG. 7 is a perspective view showing a state where the porous rod-like member with dielectric layers and solid electrolytic layers formed thereon is divided into chip-like capacitor elements.
Figure 8A:
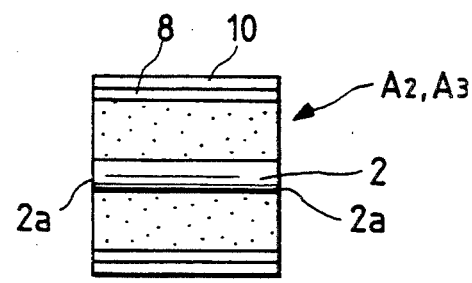
FIGS. 8A, 8B, and 8C are cross sectional views showing the capacitor element formed by the step of FIG. 7.
Figure 8B:
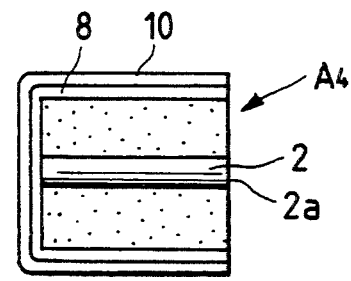
Figure 8C:
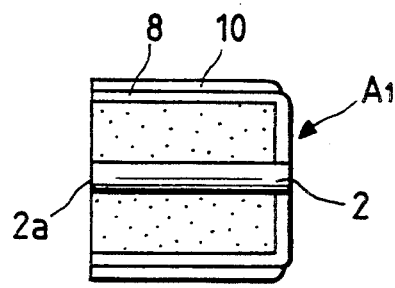

As shown in FIG. 7, each of the porous rod-like members 5 thus formed is cut into several chip-like capacitor elements A (A1 to A4) of proper size by a diamond cutter, for example. Of those capacitor elements A, the capacitor elements A2 and A3, cut out from the middle part of the porous rod-like member 5, are as shown in FIG. 8A. As shown, the end faces 2a of the metal rod 2 are exposed outside at both end faces (cut faces) of the capacitor element A2 or A3. The tantalum pentoxide layer 8 and the manganese dioxide layer 10 are formed on the outer surface of the capacitor element A2 or A3, except the end faces thereof. The capacitor element A4 cut out from the lower part of the porous rod-like member 5 is shaped as shown in FIG. 8B. As shown, the first end face 2a of the metal rod 2 is exposed outside at one end face of the capacitor element A4. The remaining outer faces of the capacitor element A4 are covered with the tantalum pentoxide layer 8 and the manganese dioxide layer 10. The capacitor element A1 is cut out from the upper part of the porous rod-like member 5. The metal rod 2 extended from the upper face 5a of the porous rod-like member 5 is cut out. Further, if the tantalum pentoxide layer 8 and/or the manganese dioxide layer 10 is removed from the upper face 5a of the porous rod-like member 5, the resultant structure is the same as that of the capacitor element A2 or A3, as shown in FIG. 8A. If only the metal rod 2 extended from the upper face 5a of the porous rod-like member 5 is cut out, the resultant structure is as shown in FIG. 8C. These depend on the area of the tantalum pentoxide layer 8 over which the manganese dioxide layer 10 extends. These layers may be cut out at a proper position. As a matter of course, to form the capacitor element A, the porous rod-like members 5 may be completely immersed in the aqueous solution, up to the upper face 5a of the porous rod-like member 5 in the process for forming the tantalum pentoxide layer 8 and the manganese dioxide layer 10. The porous rod-like member 5 may be immersed in the manganese nitrate aqueous solution 9 more deeply than in the phosphate aqueous solution 7. In this case, the formed manganese dioxide layer 10 is formed covering the area of the tantalum pentoxide layer 8. Accordingly, the capacitor manufacturing work and the process control are simple and easy.

Figure 9:
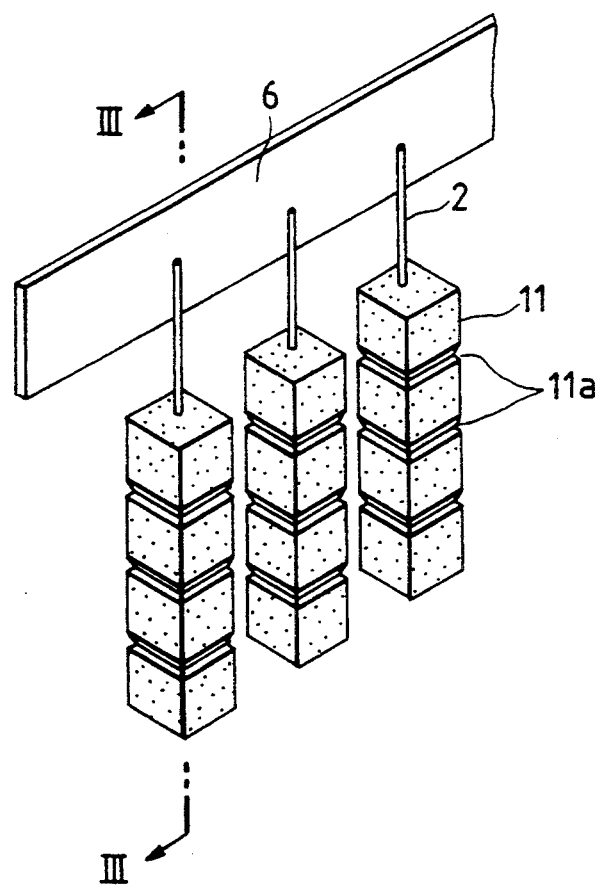
FIG. 9 is a perspective view showing a series of porous rod-like members with grooves formed thereon being mounted on a horizontal plate.
Figure 10:
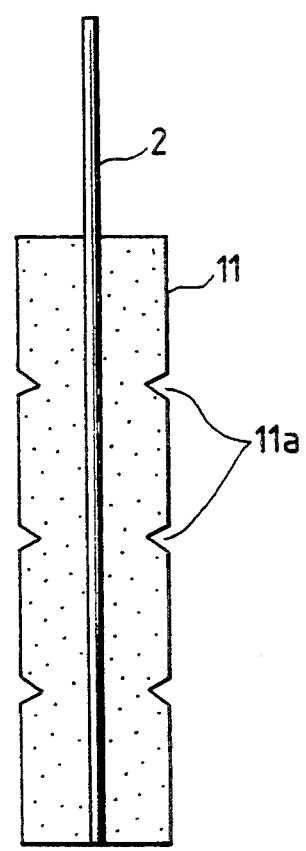
FIG. 10 is a cross sectional view taken on line III—III in FIG. 9.

Another method of manufacturing the capacitor elements will be described. In this method, as shown in FIGS. 9 and 10, continuous grooves 11a are formed on the outer surface of a porous rod-like member 11 shaped like a square rod, while being equidistantly spaced in the longitudinal direction of the rod-like member. A metal rod 2 is implanted in the porous rod-like member 11 in a state that the upper part of the metal rod 2 is extended from the top end of the rod-like member and the lower end thereof reaches the bottom of the rod-like member. The porous rod-like member 11 is sintered. A plural number of the sintered porous rod-like members 11 are fastened on a horizontal plate 6 as in the manufacturing method already described. Then, the dielectric layers and the solid electrolytic layers are formed on the outer surface of the porous rod-like member 11. The porous rod-like member 11 with the dielectric layer and the solid electrolytic layer formed thereover may be easily divided into capacitor elements by bending it at the grooved parts, or the grooves 11a, without using any cutting means, for example, the diamond cutter. As a matter of course, the grooves 11a may be discontinuous.

Figure 11:
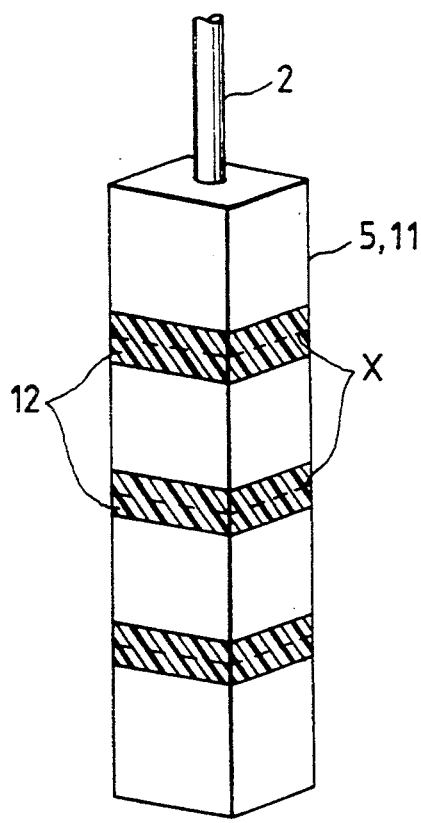
FIGS. 11 is a perspective view showing a porous rod-like member with resin layers formed along the dividing locations thereof.

In forming the capacitor elements by either of the manufacturing methods as described above, resin layers 12 may be formed on the outer surface of the porous rod-like member 5 or 11 along and covering dividing lines by coating, for example, as shown in FIG. 11. The formation of the resin layers may be before or after the tantalum pentoxide layer 8 are formed. When the porous rod-like member is divided into the capacitor elements, and these capacitor elements are assembled into capacitors, the resin layers reliably insulates the anode from the cathode. The resin layers conveniently acts for the assembled capacitors to be described hereinafter.

Figure 12:
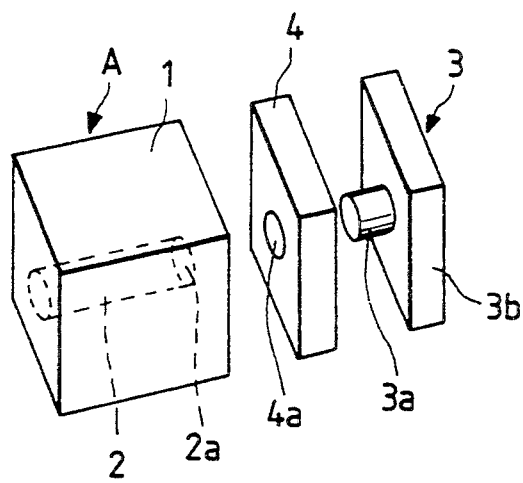
FIG. 12 is a perspective view showing how a capacitor is assembled.

To assemble a capacitor, as shown in FIG. 12, the protruded part 3a of the anode member 3 is inserted through a through hole 4a of the insulating layer 4, and the end face of the protruded part 3a is brought into contact and connected with the first end face 2a of the metal rod 2 of the capacitor element A in a state that the insulating layer 4 is sandwiched between the capacitor element A and the anode member 3. The anode member 3 is made of such a metal as copper, iron, aluminum, or tantalum.

Alternatively, a capacitor may be assembled in a manner that the end face of the protruded part 3a is brought into contact or connected with the first end face 2a of the metal rod 2 of the capacitor element A, and in this state molten resin is injected into a space between the end face of the element body 1 and the flange part 3b of the anode member 3. The insulating layer 4 thus formed of resin covers the outer surface of the protruded part 3a of the anode member 3.

The outer diameter of the insulating layer 4, when it is selected to be slightly larger or smaller than the outer diameter of the capacitor element A or the anode member 3, provides a reliable insulation of the anode from the cathode of the resultant capacitor that is mounted on a printed circuit board by soldering.

To ensure a reliable connection of the end face of the protruded part 3a of the anode member 3 with the first end face 2a of the metal rod 2, it is preferable to form metal layers of solder or nickel, for example, on the respective end faces by plating before the assembling of the capacitor.

Figure 13:
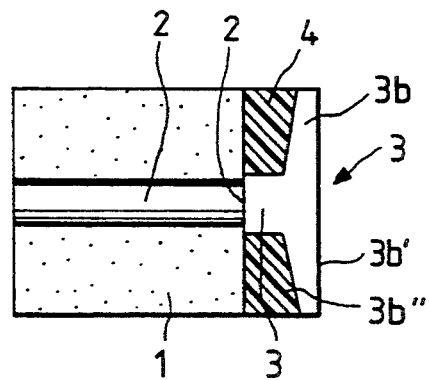
FIG. 13 is a cross sectional view showing another embodiment of the present invention.
Figure 14:
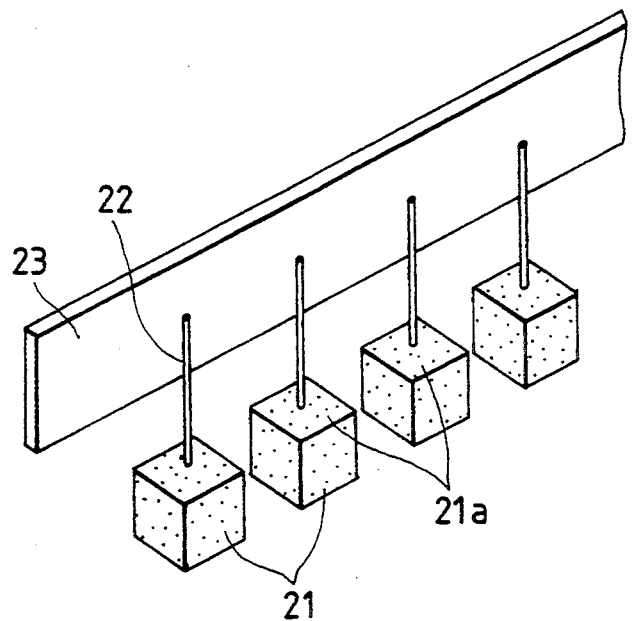
FIG. 14 is a view, in perspective form, showing a conventional method of manufacturing a solid electrolytic capacitor, the illustration showing a series of chips being mounted on a horizontal plate.
Figure 15:
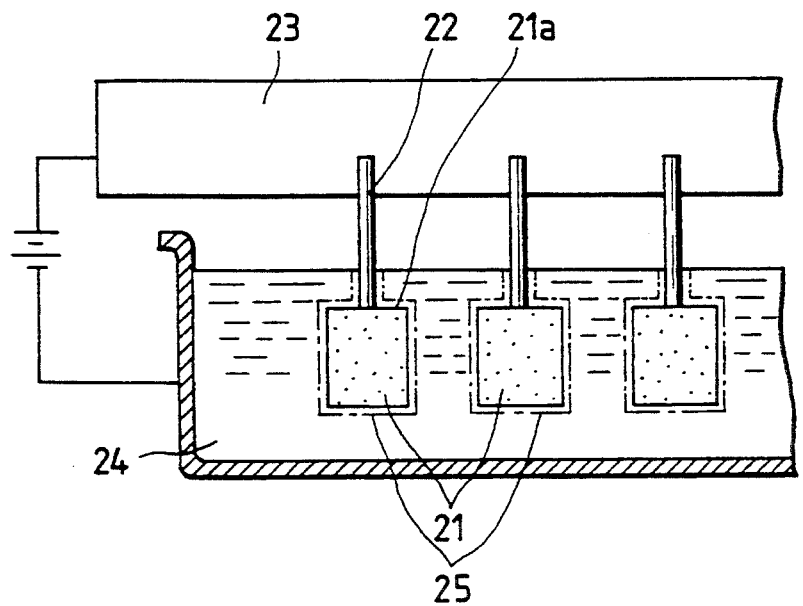
FIG. 15 is another view, in cross sectional form, showing the conventional manufacturing method, the illustration showing a state where dielectric layers are formed on the chips according to the conventional manufacturing method.
Figure 16:
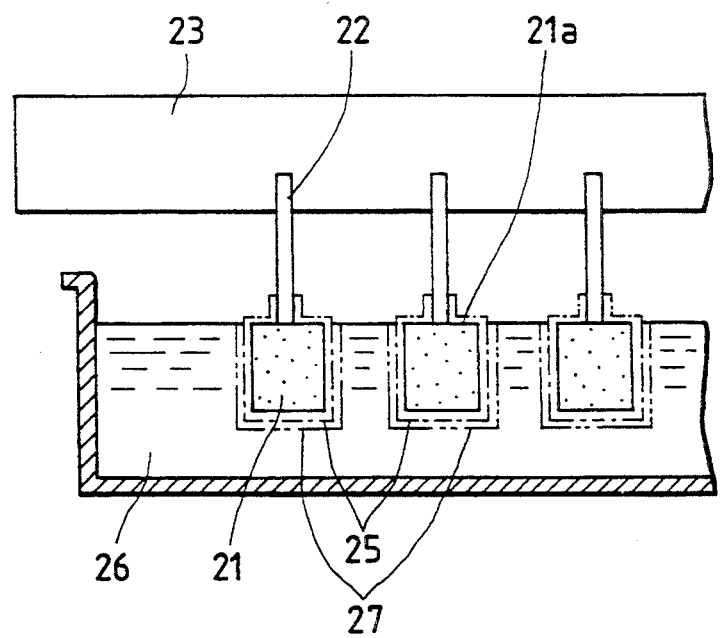
FIG. 16 is a cross sectional view showing a state where solid electrolytic layers are formed on the dielectric layers that are already formed on the chips, according to the conventional manufacturing method.
Figure 17:
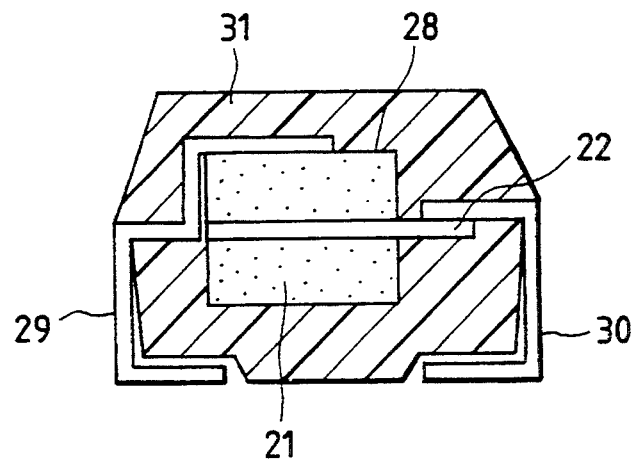
FIG. 17 is a cross sectional view showing a general electrolytic capacitor manufactured according the conventional manufacturing method.

As shown in FIG. 13, a part or the entire surface 3b' of the anode member 3, which faces the insulating layer 4, may be tapered in the range from the root of the protruded part 3a of the anode member 3 to the outer edge of the flange part 3b. A part or the entire outer edge of the surface 3b" of the anode member 3, which is opposite to the surface 3b', may be beveled.

In the structure of the capacitor shown in FIG. 13, the end face 2b of the metal rod 2 is exposed outside on the end face of capacitor element A which is opposite to the end face thereof having the insulating layer 4. If required, this end face of the capacitor element A may be covered with an insulating layer for the purpose of protection, as shown in FIGS. 1 and 2. In these figures, the insulating layer is designated by reference numeral 13.

Figure 18:
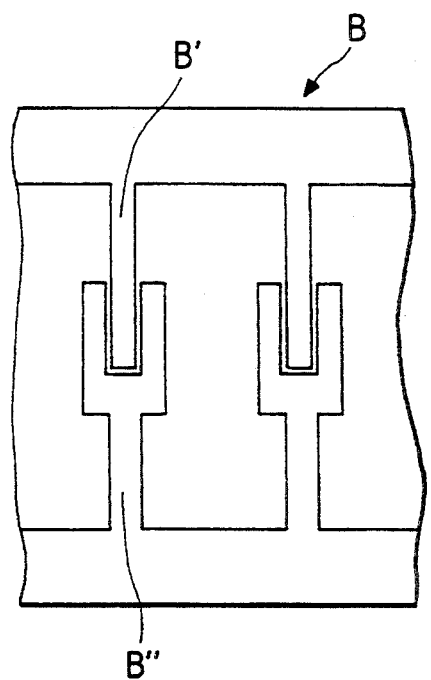
FIG. 18 is a plan view showing a part of a lead frame to which the capacitor element is applied.
Figure 19:
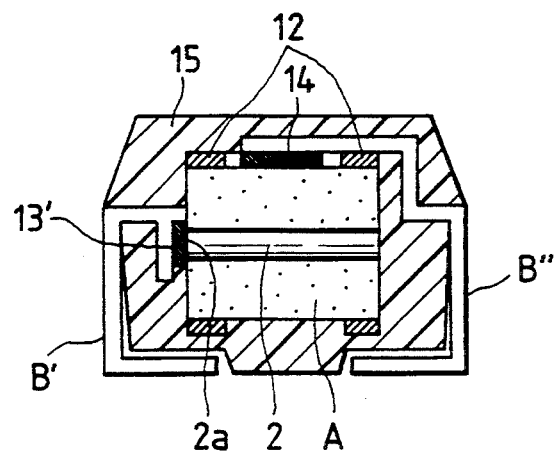
FIG. 19 is a cross sectional view showing a capacitor constructed using the lead frame of FIG. 18.

The capacitor element A with the resin layer 12 formed along and covering the division lines as shown in FIG. 11 may be applied to a lead frame B with inner leads B' and B" as shown in FIG. 18. In this case, the tip of the inner lead B' is connected through a conductive means, for example, a metal bump 13', to the first end face 2a of the metal rod 2 of the capacitor element A, while the inner lead B" is connected to the cathode of the capacitor element A, for example, the conductive layer 14 as a graphite layer or a silver layer. The capacitor element A thus connected with the inner leads B' and B" is molded by resin 15, as shown. As a result, a resin-sealed capacitor is formed.

The porous rod-like member 5 and 11, which is square in cross section in the above-mentioned embodiments, may be circular or polygonal. When the porous rod-like member, shaped circular in cross section, is used, the flange part 3b of the anode member 3 is shaped polygonal, for example, square in cross section. If required, the insulating layer 13 may be shaped in cross section like the flange part 3b of the anode member 3. In this case, the resultant capacitor may be used as intact, as a surface mounting part.

As seen from the foregoing description, in manufacturing the capacitor according to the present invention, there is no need of molding the capacitor element by resin. Therefore, the volumetric efficiency of the capacitor of the invention can be remarkably improved when compared with that of the conventional capacitor. This brings about reduction of size and weight of the products.

An additional advantageous effect of the invention is that the manufacturing work and process control are simple and easy.

A further advantageous effect is that capacitors of different capacitance values can be manufactured by merely changing the division size when the porous rod-like member is divided.

Consequently, the capacitor manufacturing method of the invention and the capacitor manufactured by the manufacturing method are suitable for a mass production system.

What is claimed is:

1. A solid electrolytic capacitor comprising:
    a capacitor element body consisting of a chip-like porous solid formed by shaping and sintering rectifying metal particles, said porous solid having a dielectric layer formed thereon and a solid electrolytic layer formed on said dielectric layer;
    a metal rod extended through the central part of said element body having one end face at one end surface of the element body and another end face at an opposite end surface of the element body;
    an anode member including a protruded part and a flange part, the end face of the protruded part being brought into contact and connected with one of the end faces of said metal rod; and
    an insulating layer placed between the flange part of said anode member and one end surface of said element body.

2. A solid electrolytic capacitor as claimed in claim 1, said rectifying metal particles are one of tantalum and niobium.

3. A solid electrolytic capacitor as claimed in claim 1, wherein a surface of the anode member which faces with said insulating layer is tapered.

4. A solid electrolytic capacitor as claimed in claim 1 further comprising a second insulating layer formed to cover the other end surface of the capacitor element body.

5. A solid electrolytic capacitor as claimed in claim 1, wherein the outer size of the insulating layer is different from outer size of the, capacitor element body.

6. A solid electrolytic capacitor as claimed in claim 1, wherein said end faces of the protruded part of the anode member and the metal rod are covered by a metal layer to ensure a reliable connection therebetween.

7. A method of manufacturing solid electrolytic capacitors comprising the steps of:
    shaping rectifying metal particles into a porous rod-like member with a metal rod implanted therein and sintering said porous rod-like member;
    forming a dielectric layer on the surface of said porous rod-like member;
    forming a solid electrolytic layer on the dielectric layer already formed; and
    dividing said porous rod-like member having the dielectric layer and the solid electrolytic layer into a plural number of chip-like capacitor elements of proper size.

8. A method of manufacturing solid electrolytic capacitors as claimed in claim 7, wherein grooves are formed on the outer surface of said porous rod-like member while being spaced at proper spatial intervals.

9. A method of manufacturing solid electrolytic capacitors as claimed in claim 7, wherein an insulating layer is formed on the outer surface of said porous rod-like member before or after the step of formation of said dielectric layer.

10. A method of manufacturing solid electrolytic capacitor as claimed in claim 7, further comprising a step of assembling the capacitor, in which a protruded part of an anode member is inserted through a through hole of an insulating layer and the end face of the protruded part is brought into contact and connected with a first end face of the metal rod in such manner that the insulating layer is sandwiched between the capacitor element body and the anode member.

11. A method of manufacturing solid electrolytic capacitor as claimed in claim 7, further comprising a step of assembling the capacitor, in which the end face of a protruded part of an anode member is brought into contact and connected with the first end face of the metal rod, and in this condition, molten resin is injected into a space between the end face of the capacitor element body and a flange portion of the anode member.

* * * * *